July 31, 1962 P. R. DAHL 3,046,739
GAS TURBINE FUEL CONTROL SYSTEM
Filed May 26, 1960 2 Sheets-Sheet 1
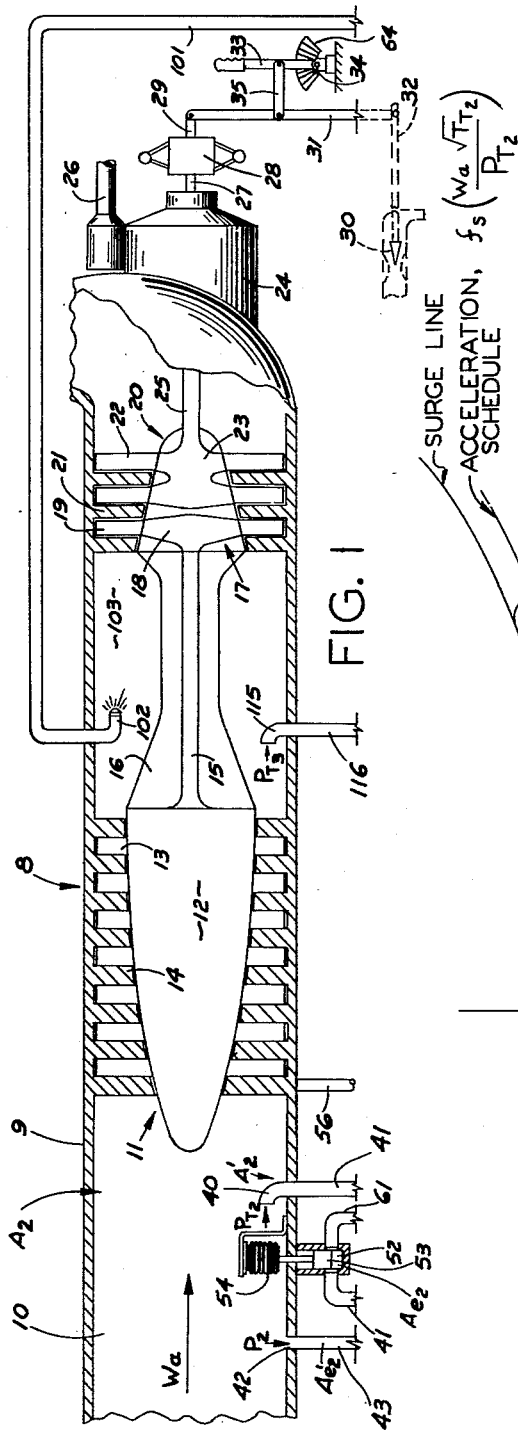
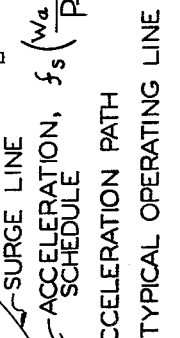
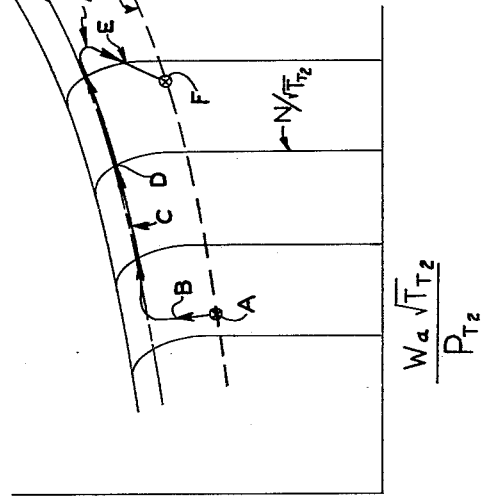
FIG. 3
*INVENTOR.*
PHILIP R. DAHL
BY
ATTORNEY

INVENTOR.
PHILIP R. DAHL

United States Patent Office 3,046,739
Patented July 31, 1962

3,046,739
GAS TURBINE FUEL CONTROL SYSTEM
Philip R. Dahl, Sepulveda, Calif., assignor to The Marquardt Corporation, Van Nuys, Calif., a corporation of California
Filed May 26, 1960, Ser. No. 32,034
6 Claims. (Cl. 60—39.28)

This invention relates to a gas turbine fuel control system and more particularly to a fuel control system for small gas turbines which permits maximum possible acceleration over a wide altitude range.

At present, control systems for small gas turbines utilize a speed governor to directly control the fuel valve, and an input speed change command can be applied to the governor. However, this type of fuel control is not readily adaptable to sensing the operating parameters within the gas turbine which must be controlled to prevent compressor surge during acceleration.

In the present invention, a first set of parameters are utilized to regulate speed at a selected steady state value and a second set of parameters are automatically brought into control when an increased fuel flow command requires an acceleration of the gas turbine to a new steady state speed. The new set of parameters controls fuel flow so that maximum acceleration can take place over a wide altitude range without surge of the compressor. Thus, better performance of the gas turbine results because of its better acceleration characteristics. The switch from one set of control parameters to another is accomplished by a switching valve which continually senses all of the pressures representing the control parameters. The switching valve compares the pressure error in each set of parameters and the set of parameters in which the pressure differential is the most negative is the one which controls the fuel flow.

It is therefore on object of the present invention to provide a gas turbine fuel control system having one set of parameters utilized to maintain a steady state speed condition and a second set of parameters used to permit maximum acceleration over a wide range of altitude.

Another object of the present invention is to provide a gas turbine fuel control system having a switching valve for switching control of the fuel flow from one set of parameters to another set of parameters when acceleration of the turbine is called for as a result of an increased fuel command.

A further object of the present invention is to provide a gas turbine fuel control system which compares a pressure approximately proportional to turbine speed with a pressure representing a command speed input in order to regulate fuel flow to maintain a selected speed.

Another object of the invention is to provide a gas turbine fuel control system in which the compressor pressure ratio is controlled during acceleration as a function of corrected air mass flow to prevent compressor surge.

These and other objects of the invention not specifically set forth above will become readily apparent from the accompanying description and drawings, in which:

FIGURE 1 is a schematic illustration of a gas turbine which is controlled by the fuel control system of the present invention.

FIGURE 3 is a graphic illustration of compressor performance during acceleration from one steady state condition to another steady state condition of higher turbine speed.

Figure 2:
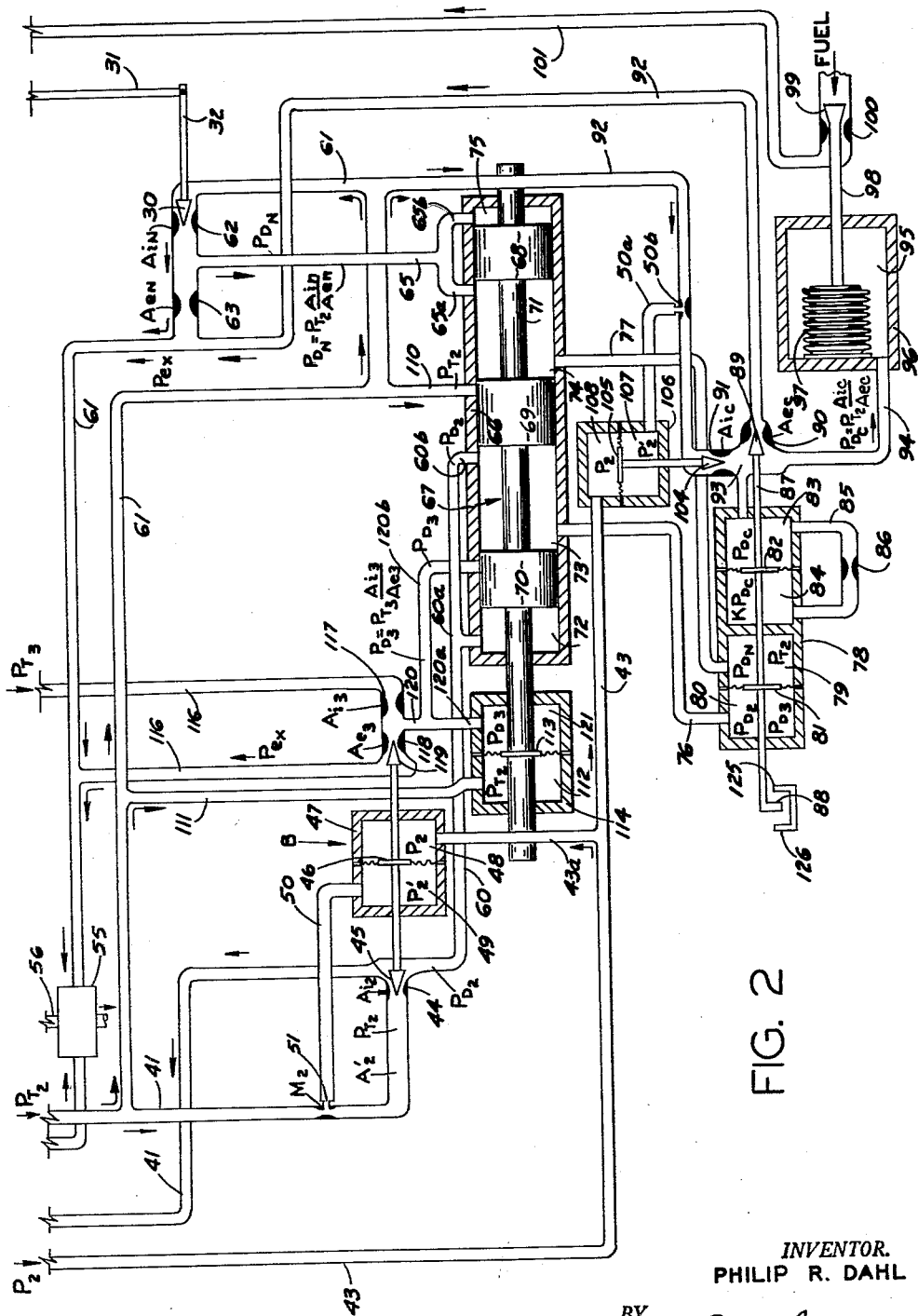
FIGURE 2 is a diagrammatic illustration of the control system of the present invention.

Referring to the embodiment chosen for illustration, the gas turbine 8 comprises a casing 9 having an inlet portion 10 of area $A_2$ which receives air from an inlet opening (not shown) and supplies air to the compressor 11. The compressor comprises a hub 12 carrying a plurality of blades 13 which cooperate with stator blades 14. A compressor shaft 15 is mounted in a bearing housing 16 and connects hub 12 with the input turbine 17 consisting of a hub 18 carrying a single row of blades 19. The output turbine 20 consists of two rows of blades 21, 22 carried by a hub 23 which is connected to a gearbox 24 by a shaft 25. The gearbox 24 contains speed reduction gearing (not shown) connected with an output shaft 26 and a governor shaft 27 is connected with the gearing to rotate the governor 28 at a speed proportional to the turbine speed. A pin 29 is moved by the governor and this movement is imparted to a needle valve 30 through links 31 and 32 when handle 33 is fixed in position. Handle 33 is pivotally supported at pin 34 and is connected to link 31 by link 35 so that the handle 33 can override the governor and move the needle valve 30.

Speed Computer Pressure ($P_{D_2}$)

A probe 40 is located in inlet portion 10 upstream of the compressor so that the total compressor inlet pressure $P_{T_2}$ is introduced to tube 41 having an area $A'_2$. Also, a static pressure opening 42 is located at inlet portion 10 and connects the static compressor inlet pressure $P_2$ with a tube 43. The tube 41 contains an arifice 44 having throat area $A_{1_2}$ and the area is varied by a needle 45 connected to diaphragm 46 in casing 47. Space 48 on one side of the diaphragm is connected by branch passage 43a to the static pressure $P_2$ at opening 42. Space 49 on the opposite side of the diaphragm 46 is connected by passage 50 to the static pressure $P'_2$ in venturi 51 located in tube 41. Thus, the needle 45 is positioned so that the static pressure in venturi 51 is the same as static pressure $P_2$ in the main duct portion 10. Since the total pressure $P_{T_2}$ is also equal in the duct portion 10 and in venturi 51, the mass flow per unit area ($W_P$) in venturi 51 is the same as the mass flow ($W_a$) in the main duct portion 10; it being understood the Mach number in the venturi 51 and the duct portion 10 are the same.

The tube 41 exhausts through an orifice 52 which is varied in area by a valve 53 carried by a temperature sensitive element 54, responsive to the temperature at the duct portion 10. The throat area $A_{e_2}$ of orifice 52 is therefore varied in accordance with the total compressor inlet temperature $T_{T_2}$. The orifice 52 is connected with a vacuum pump 55 which is driven by a shaft 56 connected in a suitable manner (not shown) with the compressor hub. By utilizing a vacuum at the end of tube 41, the orifices 44 and 52 will remain choked with sonic velocity at their throats regardless of the magnitude of the pressure at probe 40. A passage 60 connects with tube 41 at a location upstream of orifice 52 and contains the pressure $P_{D_2}$. The mass flow through orifice 52 can be represented as follows:

$$W_P = \frac{(.532) P_{D_2} A_{e_2}}{\sqrt{T_{T_2}}}$$

and $$P_{D_2} = \frac{W_P \sqrt{T_{T_2}}}{(.532) A_{e_2}}$$

Also, the area $A_{e_2}$ of orifice 52 can be stated as:

$$A_{e_2} = K_1 / \sqrt{T_{T_2}}$$

where $K_1$ is a constant.
Therefore $$P_{D_2} = \frac{W_P \cdot T_{T_2}}{K_2} = \frac{W_a \cdot T_{T_2}}{K_3}$$

where $K_2$ and $K_3$ are also constants.

FIGURE 3 shows in general form the characteristics of a gas turbine compressor. It is well known that corrected speed is approximately proportional to corrected mass flow over most of the operation range of the compressor. However, this proportionality does vary slightly with compressor pressure ratio. Utilizing this approximation $$\frac{W_a\sqrt{T_{T_2}}}{P_{T_2}} \doteq K_4 \frac{N}{\sqrt{T_{T_2}}}$$

where $K_4$ is a constant and N is actual turbine speed. Solving for $W_a T_{T_2}$:

$$W_a T_{T_2} = K_4 N P_{T_2}$$

and then $$P_{D_2} = K_5 \cdot N \cdot P_{T_2}$$

where $K_5$ is a constant.

*Command Speed Pressure ($P_{D_N}$)*

A branch passage 61 connects the pressure $P_{T_2}$ in tube 41 with the vacuum pump 55 through spaced orifices 62 and 63 having areas $A_{i_N}$ and $A_{e_N}$, respectively. The needle valve 30 serves to vary the area of orifice 62 and the position of the needle is calibrated on scale 64 in terms of selected speed $N_c$ of the output shaft 25. Once the desired value of $N_c$ is set by the handle 33, this value will thereafter be maintained with small error by the action of the governor 28 and the valve 30. The link 31 may be disconnected from the speed governor and attached to a fixed pivot in which case the setting of the handle 33 will select the compressor speed to be maintained. A conduit 65 connects with passage 61 at a location between the orifices and contains the command speed pressure $P_{D_N}$. The two orifices function as a pressure divider, such as disclosed in U.S. Patent Re. 24,401 granted December 31, 1957 to John A. Drake, so that $$\frac{P_{D_N}}{P_{T_2}} = \frac{A_{i_N}}{A_{e_N}}$$

The variation of the area $A_{i_N}$ is made linear with the $N_c$ positions on scale 64. Thus:

$$A_{i_N} \triangleq K_c N_c$$

where $K_c$ is a constant. Then $$P_{D_N} = K_6 \cdot N_c \cdot P_{T_2}$$

where $K_6$ is a constant.

*Regulating Valve*

The passage 60 containing pressure $P_{D_2}$ and the conduit 65 containing the command pressure $P_{D_N}$ have branch passages 60a, 60b and 65a, 65b, respectively, connecting with a cylinder 66 at spaced locations. The cylinder 66 contains a switching valve 67 comprising enlarged portions 68, 69 and 70 on a stem 71. When the valve is in the position shown in FIGURE 2, the branch passages 60a and 60b connect, respectively, with spaces 72 and 73 on opposite sides of portion 70. Also, branch passages 65a and 65b connect, respectively, with spaces 74 and 75 on opposite sides of portion 68, and the portion 69 separates spaces 73 and 74. In the valve position shown, pressure $P_{D_2}$ communicates through space 73 with conduit 76 and pressure $P_{D_N}$ communicates through space 74 with conduit 77. These conduits connect through an integral compensator casing 78 to spaces 79 and 80 on opposite sides of a diaphragm 81. Also, a diaphragm 82 is located between spaces 83 and 84 in casing 78 and these spaces are connected by a passage 85 containing a restriction 86. Both diaphragms 81 and 82 are connected with a stem 87 slidable in openings in casing 78 and one end of the stem comprises a stop 88 while the other end comprises a needle valve 89.

The needle valve 89 controls the area of an orifice 90 which is located downstream of an orifice 91 in a passage 92. The passage 92 connects with passage 61 upstream of orifice 62 to receive the pressure $P_{T_2}$ and connects with passage 61 downstream of orifice 63 in order to exhaust to vacuum pump 55. The orifice 91 of area $A_{i_c}$ and the orifice 90 of area $A_{e_c}$ form the two orifices of a pressure divider and the pressure $P_{D_c}$ existing in space 93 between the orifices is connected by conduit 94 to the interior space 95 of an actuator 96. An evacuated bellows 97 is contained in the space 95 and is connected with a shaft 98 having a needle valve 99 at its end. Movement of the valve 99 varies the area of an orifice 100 located in fuel passage 101 leading to the fuel nozzles 102 in the combustion chamber 103 of the gas turbine 8. Thus, a change in pressure in space 95 of actuator 96 will cause movement of valve 99 to thereby vary the fuel flow to the gas turbine.

A needle valve 104 is connected to a diaphragm 105 which divides casing 106 into spaces 107 and 108. The space 108 is connected by passage 43 to the static pressure $P_2$ at opening 42 and the space 107 is connected by passage 50a to static pressure $P'_2$ in venturi 50b. Thus, the mass flow per unit area through venturi 50b is the same as in the compressor inlet portion 10 since the needle valve 104 is positioned to maintain the static pressure $P'_2$ in venturi 50b equal to the static pressure $P_2$.

*Speed Fuel Loop*

In steady state operation, the pressure $P_{D_2}$ in line 60 and the pressure $P_{D_N}$ in line 65 are fed through casing 66 to opposite sides of diaphragm 81. The difference between $P_{D_2}$ and $P_{D_N}$ in steady state must be zero because of the integral action of restriction 86. Therefore $$K_5 N P_{T_2} = K_6 N_c P_{T_2}$$

showing that the compressor speed N is directly proportional to input displacement $N_c$ of needle 30 assuming that the speed governor is disconnected from the needle 30. If the governor is connected, the turbine shaft speed would be proportional to needle position. The output of the diaphragm 81 positions needle valve 89 to drive the bellows 97 and control the fuel flow to the gas turbine by controlling the position of valve 99. Thus, for any input position $N_c$ of needle valve 30, the needle valve 89 will control the fuel flow rate to the gas turbine to produce a compressor or turbine shaft speed N proportional to selected speed $N_c$ or handle position respectively.

*Pressure Ratio Fuel Loop*

When $N_c$ is greater than N, the valve $P_{D_N}$ will be greater than $P_{D_2}$ and movement of valve 99 will result to increase fuel flow for acceleration. To prevent compressor surge, it is necessary to limit fuel flow such that $$\frac{P_{T_3}}{P_{T_2}} \leq f\left(\frac{W_a\sqrt{T_{T_2}}}{P_{T_2}}\right)$$

To accomplish this, a branch passage 110 connects pressure $P_{T_2}$ in passage 61 with casing 66 of switching valve 67 at a location normally opposite valve portion 69 during steady state operation. Also, a branch passage 111 connects pressure $P_{T_2}$ in passage 61 with space 112 on one side of diaphragm 113 located in casing 114. A probe 115 introduces compressor discharge pressure $P_{T_3}$ to passage 116 which connects to vacuum pump 55 through a first orifice 117 of area $A_{i_3}$ and a second orifice 118 of area $A_{e_3}$. A needle valve 119 is connected with diaphragm 46 in casing 47 and varies the area of orifice 118 to vary the pressure $P_{D_3}$ existing between the orifices. A passage 120 connects with passage 116 at a location between orifices 117 and 118 and has a branch 120a connecting with space 121 in casing 114 opposite space 112. A second branch 120b connects with casing 66 at a position normally opposite valve portion 70 during steady state operation.

The divided pressure in passage 120 is represented as $$P_{D_3} = \frac{A_{i_3}}{A_{e_3}} \cdot P_{T_3}$$

and $$A_{e_3} = K_7 f_s\left(\frac{W_a\sqrt{T_{T_2}}}{P_{T_2}}\right)$$

since $A_{e_3}$ is a function of the displacement of needle valve 119 which in turn is a function only of corrected air mass flow.

Thus $$P_{D_3} = \frac{A_{i_3}}{K_7 f_s\left(\frac{W_a\sqrt{T_{T_2}}}{P_{T_2}}\right)} \cdot P_{T_3}$$

When the valve 67 is shifted to the left upon an increase in fuel flow, it connects branches 120b and 110 to the spaces on opposite sides of diaphragm 81, and the difference between $P_{D_3}$ and $P_{T_2}$ must be nearly zero during acceleration because of the integral compensation action of restriction 86. However, $P_{D_3}$ will not be exactly the same as $P_{T_2}$ because the integral compensator will allow a velocity error during the acceleration transient. Thus $$\frac{P_{T_3}}{P_{D_3}} = \frac{K_7}{A_{i_3}} \cdot f_s\left(\frac{W_a\sqrt{T_{T_2}}}{P_{T_2}}\right) \approx \frac{P_{T_3}}{P_{T_2}}$$

Therefore, the acceleration pressure ratio $P_{T_3}/P_{T_2}$ will closely approximate a desired function of corrected mass flow thereby preventing surge.

Switching of Loops

The switching valve 67 is an auctioneer type pneumatic device which senses the error signals from the speed fuel loop and from the pressure ratio fuel loop and permits the most negative error signal to pass through to diaphragm 81 of the integral compensator 78 and take control. In other words, the error signal which calls for the least fuel flow will be in command. Since the areas of valve 67 upon which the error signals act are equal, the following conditions can prevail.

When $$(P_{T_2} - P_{D_3}) > (P_{D_N} - P_{D_2})$$

then the speed loop pressures $P_{D_2}$ and $P_{D_N}$ control fuel flow.

When $$(P_{T_2} - P_{D_3}) < (P_{D_N} - P_{D_2})$$

then the pressure ratio loop pressures $P_{T_2}$ and $P_{D_3}$ control fuel flow. For example, if a speed increase is desired, the command needle 30 is pulled out to increase pressure $P_{D_N}$. This signal is fed to the integral compensator 78 which calls for increasing fuel flow since movement of valve 89 to the left will be in a direction to decrease pressure $P_{D_c}$ in passage 94. When the difference between pressures $P_{D_N}$ and $P_{D_2}$ acting on the end surfaces of valve portions 68 and 70, respectively, becomes greater than the difference between pressures $P_{T_2}$ and $P_{D_3}$ acting on the opposite side of diaphragm 113, then the valve 67 is displaced to the left allowing the $P_{T_2}$ and $P_{D_3}$ signals to take command. If $P_{D_3}$ is less than $P_{T_2}$ after movement of valve 67 to the left, fuel flow will continue to increase until $P_{D_3}$ is equal to $P_{T_2}$ at which time fuel flow ceases to increase. If $P_{D_3}$ were equal to $P_{T_2}$ when the valve 67 is switched, the pressure ratio loop would control from the outset. As the speed increases, $P_{D_2}$ increases until $P_{D_2}$ equals $P_{D_N}$ indicating that the gas turbine is up to the desired speed. Since $P_{T_2}$ will be slightly greater than $P_{D_3}$ due to the velocity error, the switching valve 67 will move to the right when $P_{D_2}$ is slightly greater than $P_{D_N}$, and fuel flow will be reduced for $P_{D_2} > P_{D_N}$ and a slight overshoot in speed is likely. Fuel flow will be reduced until a new operating point is reached at which time it becomes constant.

Referring to FIGURE 3, the point A represents a steady state operation point with pressure $P_{D_2}$ and $P_{D_N}$ of the speed loop controlling. Vertical portion B of acceleration curve C represents the increase in pressure $P_{T_3}$ accompanying the increase in fuel flow during substantially constant $P_{T_2}$, resulting from increase in pressure $P_{D_N}$. The portion D of the curve C represents the pressure ratio control wherein $$P_{D_3} = P_{T_2}$$

as the speed increases and portion E represents the speed loop control after valve 67 has switched back to the right side with resulting fuel reduction to arrive at the new operation point F.

Rich and Lean Fuel Air Ratio Limiting

The diaphragm motor 166 maintains the static pressure in venturi 50b, equal to the static pressure in portion 10 of the main duct so that the mass flow through orifice $A_{e_c}$ can be represented as follows:

$$W_P = \frac{(.532) P_{D_c} A_{e_c}}{\sqrt{T_{T_2}}}$$

Since $W_P$ is proportional to $W_a$, then $$P_{D_c} = \frac{K_8 W_a \sqrt{T_{T_2}}}{A_{e_c}}$$

Spaced stops 125 and 126 are provided to engage stop 88 and limit the travel of needle valve 89. The stop 125 corresponds to the lean limit and stop 126 corresponds to the fuel rich limit. By making $A_{e_c}$ at the stops equal to $$A_{e_{c_s}} \sqrt{\frac{T_{T_2}}{T_c}}$$

$$P_{D_c} = \frac{K_8 \sqrt{T_c}}{A_{e_{c_s}}} W_a$$

wherein $T_c$ equals a constant temperature reference and $$A_{ecs}$$

is the area at either stop. Since fuel flow $W_f$ is proportional to $P_{D_c}$, the stops will permit only fixed fuel-air ratios which correspond to rich and lean limits.

Summary

In summary, the present invention utilizes a first speed fuel loop to maintain a selected gas turbine speed. This loop compares a pressure $P_{D_N}$ proportional to a selected speed with a pressure $P_{D_2}$ approximately proportional to actual speed. The fuel flow to the gas turbine is controlled by the difference in these two pressures to maintain a steady state speed condition. However, upon a sudden change in the pressure $P_{D_N}$ resulting from a change in selected speed, the pressure ratio fuel loop takes command and compares pressures $P_{D_3}$ and $P_{T_2}$. The pressure $P_{D_3}$ is a fraction of pressure $P_{T_3}$ related to the corrected air mass flow so that by making $P_{D_3}$ equal to $P_{T_2}$, the pressure ratio $P_{T_3}/P_{T_2}$ during acceleration will closely approximate a desired relation with corrected air mass flow thereby preventing compressor surge. The switching valve 67 changes the fuel control from one loop to another, and the loop having the smallest differential between control pressures will be in control.

It is understood that the control system of the present invention could include various control components to control additional elements of a turbojet, such as a variable inlet or a variable exhaust nozzle. The use of the speed governor 28, which permits control of the shaft speed 26, is utilized in the event the shaft were connected to the propellor of a turboprop engine. However, the control system could control compressor speed in the event that the governor 28 were eliminated and the gas turbine were utilized to operate an automobile. In this case, the operator would be the speed sensor to maintain the desired output shaft speed independently of the load on the gas turbine shaft. Other gas turbine pressures can be utilized to develop a signal of compressor speed, selected speed, and corrected air mass flow, by the use of appropriate components. Various other modifications are contemplated by those skilled in the art without departing from the spirit and scope of the invention as hereinafter defined in the appended claims.

What is claimed is:

1. A gas turbine fuel control system comprising means for obtaining a first pressure $P_{D_2}$ substantially proportional to gas turbine speed, said obtaining means comprising a probe receiving total compressor inlet pressure and connected with a pair of spaced restrictions having sonic flow at the throats thereof, a first pressure differential means receiving the static compressor inlet pressure on one side thereof and receiving the static pressure in said probe on the other side thereof, a needle valve connected to said first differential means for varying the area of one of said restrictions so that the pressure between said restrictions corresponds to said first pressure $P_{D_2}$, means for producing a second pressure $P_{D_N}$ proportional to a selected speed, a second pressure differential means receiving said first pressure on one side thereof and said second pressure on the other side thereof, and means connected with said second differential means for controlling the fuel flow to said gas turbine to maintain said first and second pressures equal and said gas turbine speed at the selected speed.

2. A gas turbine fuel control system as defined in claim 1 wherein said second pressure producing means comprises a pair of spaced orifices connected with said probe and having sonic flow at the throats thereof, a needle valve selectively movable to vary the throat area of one of said orifices to select the gas turbine speed, and means connected intermediate said orifices to receive said second pressure $P_{D_N}$.

3. A gas turbine fuel control system as defined in claim 2 having means for obtaining a third pressure $P_{T_2}$ representing total compressor inlet pressure, means for obtaining a fourth pressure $P_{D_3}$ which is a function of total compressor discharge pressure and corrected air mass flow, said fourth pressure obtaining means comprising a second probe receiving total compressor discharge pressure and connected with a second pair of spaced orifices having sonic flow at the throats thereof, a needle valve for varying the area of one orifice of said second pair and connected with said first differential means, and means connected intermediate said second pair of orifices to obtain said fourth pressure, and valve means for disconnecting said first and second pressures from said second differential means and simultaneously introducing said third and fourth pressures to said second differential means to compare said third and fourth pressures, the fuel flow being controlled after switching of said valve means to prevent compressor surge during acceleration of the turbine by maintaining said third and fourth pressures equal.

4. A gas turbine control system comprising means for obtaining a pressure $P_{T_2}$ representing total compressor inlet pressure, means for deriving from total compressor discharge pressure a pressure $P_{D_3}$ related to corrected air mass flow through the gas turbine, said deriving means comprising a probe receiving total compressor discharge pressure and connected with a pair of spaced orifices having sonic flow at the throats thereof, a needle valve for varying the area of one of said spaced orifices, first pressure differential means connected with said needle valve and positioning said needle valve as a function of corrected air mass flow, means connected intermediate said pair of orifices to receive said pressure $P_{D_3}$, second pressure differential means, means for connecting pressures $P_{T_2}$ and $P_{D_3}$ to opposite sides of second differential means during gas turbine acceleration, and control means actuated by said differential means for controlling gas turbine fuel flow to prevent pressure surge during acceleration.

5. A gas turbine fuel control system comprising means for obtaining a first pressure $P_{D_2}$ proportional to actual gas turbine speed or engine corrected air mass flow, means for obtaining a second pressure proportional to a selected turbine speed, differential means for normally comparing said first and second pressures and controlling the fuel flow to said gas turbine to maintain said selected speed or corrected air mass flow, means for obtaining a third pressure representing total compressor inlet pressure, means for deriving a fourth pressure from total compressor discharge pressure which is a function of corrected air mass flow, valve means for switching the control of said differential means to said third and fourth pressures upon a change in said second pressure calling for turbine acceleration, a needle valve connected with said differential means, said needle valve being located to vary the area of an orifice, and means connected with the pressure $P_{D_c}$ upstream of said orifice for positioning a fuel flow valve, a second orifice located upstream of said first orifice and containing a second needle valve, said second orifice being connected with a pressure probe and said second needle valve being positioned by a second pressure differential means as a function of corrected air mass flow, said second differential means receiving the static compressor inlet pressure on one side thereof and the static pressure in said probe on the other side thereof.

6. A gas turbine fuel control system as defined in claim 5 having a pair of stops for limiting the movement of said needle valve in opposite directions to provide a fuel rich limit and a fuel lean limit.

References Cited in the file of this patent

UNITED STATES PATENTS

| 2,311,851 | McClure | Feb. 23, 1943 |
|---|---|---|
| 2,406,181 | Wiegland | Aug. 20, 1946 |
| 2,693,081 | Russ | Nov. 2, 1954 |
| 2,857,739 | Wright | Oct. 28, 1958 |
| 2,947,141 | Russ | Aug. 2, 1960 |
| 2,966,141 | Corbett | Dec. 27, 1960 |

FOREIGN PATENTS

| 694,316 | Great Britain | July 15, 1960 |